Feb. 11, 1936.  L. W. ATCHISON  2,030,676
REFRIGERATING SYSTEM
Filed Sept. 29, 1933

Inventor:
Leonard W. Atchison,
by Harry E. Dunham
His Attorney.

Patented Feb. 11, 1936

2,030,676

UNITED STATES PATENT OFFICE 2,030,676

REFRIGERATING SYSTEM

Leonard W. Atchison, Schenectady, N. Y., assignor to General Electric Company, a corporation of New York Application September 29, 1933, Serial No. 691,476

6 Claims. (Cl. 62—3)

My invention relates to refrigerating systems, and particularly to such systems having a plurality of cooling units operated at different temperatures.

It is an object of my invention to provide a simple and effective refrigerating system having a plurality of evaporators, one of which is operated at a predetermined higher temperature than the others.

Another object of my invention is to provide a refrigerating system having a plurality of flooded evaporators, one of which is provided with a device for displacing liquid refrigerant therefrom for the purpose of maintaining the temperature thereof higher than that of the other evaporators.

Further objects and advantages of my invention will become apparent as the following description proceeds, and the features of novelty which characterize my invention will be pointed out with particularity in the claims annexed to and forming a part of this specification.

Figure 1:
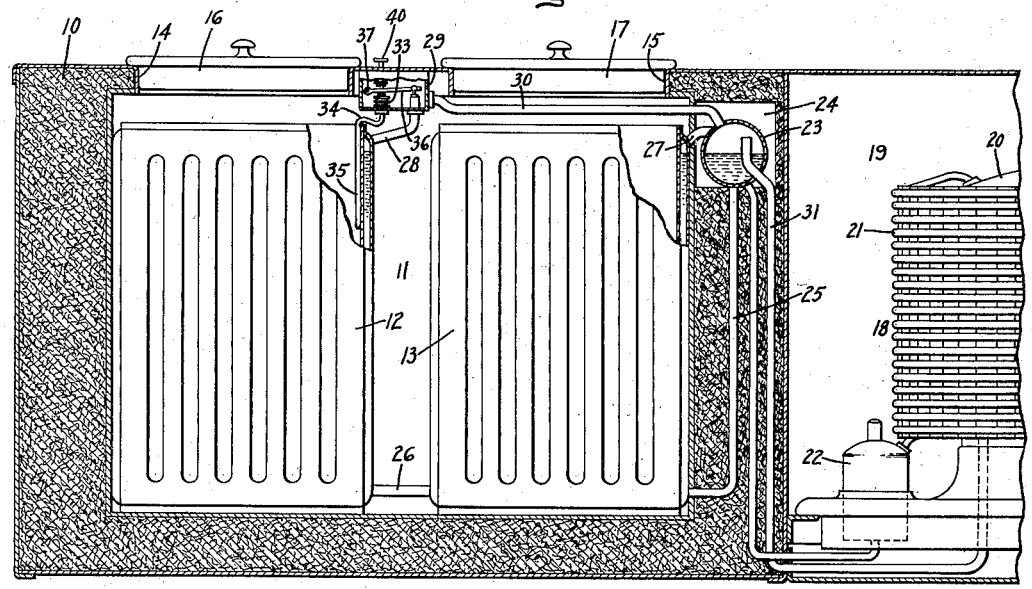
Figure 2:
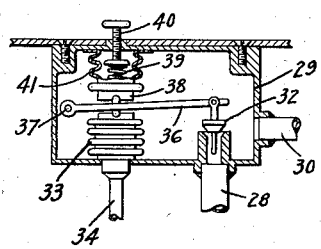

For a better understanding of my invention, reference may be had to the accompanying drawing in which Fig. 1 is a sectional view of an ice-cream dispensing cabinet embodying my invention, and Fig. 2 is a detail sectional view of a temperature-responsive valve shown in Fig. 1.

Referring to Fig. 1, I have shown an ice-cream cabinet comprising insulated walls 10 enclosing a chamber 11 in which two hollow cylindrical evaporators 12 and 13 of the flooded type are arranged to receive ice-cream containers, access to the containers being had through openings 14 and 15, respectively, which are closed by insulated removable covers 16 and 17. In order to supply liquid refrigerant to the evaporators 12 and 13, I arrange a compressor and condenser unit 18 in a compartment 19 adjacent the walls 10 of the ice-cream cabinet. Refrigerant is compressed within a casing 20 of the compressor and condenser unit 18 and flows out through condenser coil 21 where it is cooled and liquefied and then flows to a flow-controlling device or float valve 22, from which the liquid refrigerant passes in regulated quantities to a header 23 arranged in a chamber 24 in the walls 10 of the ice-cream cabinet. The liquid refrigerant flows from the header 23 through a conduit 25 to the evaporator 13 and also to the evaporator 12 through a connection 26 which joins the evaporators 12 and 13 at the lower portions thereof. The liquid refrigerant in the evaporators is vaporized due to the absorption of heat from the chamber 11, and the gaseous refrigerant is returned to the header 23, the evaporator 13 being connected to the upper portion of the header by a tube 27 and the evaporator 12 being connected therewith through a tube 28, a valve chamber 29, and tube 30. The gaseous refrigerant is withdrawn from the header 23 through a conduit 31 and returned to the compressor casing 20 by operation of the compressor therein, so that the pressure in the evaporators is maintained low enough to vaporize the liquid refrigerant therein at the desired evaporator temperature.

It is often desirable to maintain the several cooling units or evaporators of an ice-cream cabinet at different temperatures in order to keep the ice-cream at various desired consistencies, or to provide a higher temperature compartment for storing bottled goods or other articles, or cooling liquids on draught. In accordance with my invention, I provide a plurality of cooling units within a refrigerating cabinet, one or more of which are equipped with a thermostatically controlled mechanism for regulating the withdrawal of gaseous refrigerant therefrom. By this arrangement, the cooling units provided with the regulators are maintained at a higher temperature than the others.

In the embodiment of my invention shown in the drawing, I provide a valve 32 arranged in the suction line of the evaporator 12 which is to be maintained at a higher temperature than the evaporator 13. It is evident that as the valve is closed, the refrigerant vaporized within the evaporator 12 will tend to force the liquid refrigerant out of the evaporator and change the level thereof, thus reducing the heat-absorbing capacity of the evaporator and raising the temperature thereof. The valve 32 is seated in the end of the tube 28 within the chamber 29 and is actuated by a bellows 33 connected by a tube 34 to a bulb 35 secured on the inner side of the evaporator 12. The bulb 35 is partially filled with a volatile liquid, and the bellows 33 expands and contracts with changes of temperature of the bulb 35. Valve 32 is pivoted on the end of a lever 36 which swings on a stationary pivot 37 and is held against the top of the bellows 32 by a spring-pressed member 38. This construction is clearly shown in Fig. 2, where it can be seen that the spring-pressed member 38 comprises a spring 39 and an adjusting screw 40 which is sealed by a collapsible bellows 41 to prevent leakage of air into the low-pressure side of the refrigerating system. The bellows 33 is calibrated so that at a predetermined low temperature it will collapse sufficiently to close the valve 32 and prevent further withdrawal of gaseous refrigerant from the evaporator 12 through the tube 28. When the valve 32 is closed, the refrigerant vaporized in the evaporator 12 will collect and force the liquid refrigerant therein out through the connection 26 to the evaporator 13 and into the header 23, which is of a sufficient capacity to receive all of the liquid refrigerant from the evaporator 12 without overflowing or raising the liquid level in the header and the evaporator 13 above the upper end of the suction conduit 31. It is clear then that the evaporator 12 may be maintained at a higher temperature than the evaporator 13. Since the temperature of the evaporator 12 increases due to the further absorption of heat in the absence of liquid refrigerant, the bellows 33 will expand and open the valve 32 to permit the return of liquid refrigerant. The operations of opening and closing the valve 32 will thus automatically maintain the evaporator 12 at a predetermined temperature higher than that of the evaporator 13, the screw 40 being provided to adjust the temperature range of the evaporator 12.

During the operation of a refrigerator system shown in Fig. 1, ice-cream containers or other articles to be cooled are placed in the cabinet 11 within the evaporators 12 and 13, the articles to be kept at a higher temperature being placed in the evaporator 12. Liquid refrigerant will be supplied from the compressor and condenser unit 18 through a float valve 22 in regulated quantities, and a predetermined quantity will be maintained in the header 23 and the evaporators 12 and 13. Liquid refrigerant will be vaporized due to the absorption of heat by the articles within the evaporators, and the gaseous refrigerant will pass out to the header 23 from which it will be withdrawn through the suction conduit 31. When the temperature of the evaporator 12 has been reduced to a predetermined lower limit, the bellows 33 will be contracted sufficiently to close the valve 32 and prevent the removal of gas from the evaporator 12, whereupon the pressure of gas vaporized therein will force the liquid refrigerant back to the header 23 and thus permit the temperature of the evaporator 12 to increase. Upon a predetermined increase in temperature, the sylphon bellows 33 will expand and again open valve 32 to allow the liquid refrigerant to return to evaporator 12 and gaseous refrigerant to be withdrawn by operation of the compressor within the casing 20. Throughout this operation, the liquid refrigerant within the evaporator 13 will be maintained at the same level as that in the header and it will therefore continue to absorb heat and to maintain the articles placed within the evaporator 13 at a considerably lower temperature than that of the articles placed within the evaporator 12.

It is apparent from the foregoing that I have provided a simple, effective, and easily adjustable refrigerating system having evaporators operating at different temperatures.

While I have described a particular embodiment of my invention as applied to an ice-cream cabinet cooled by a compression refrigerating system, various modifications will readily be apparent to those skilled in the art, and I do not desire my invention to be limited to the particular embodiment shown and described, and I intend in the appended claims to cover all modifications within the spirit and scope of my invention.

What I claim as new and desire to secure by Letters Patent of the United States, is:

1. A refrigerating system including a plurality of flooded evaporators, a conduit connecting the lowermost portion of one of said evaporators to the others, means for supplying liquid refrigerant to said evaporators, means for withdrawing gaseous refrigerant from said evaporators, and means controlling the withdrawal of gaseous refrigerant from one of said evaporators for maintaining said one evaporator at a predetermined temperature higher than that of the others of said evaporators.

2. A refrigerating system including a plurality of flooded evaporators, a single header for said evaporators, means for supplying refrigerant to said evaporators, means connecting said evaporators to said header for withdrawing gaseous refrigerant from said evaporators, and means including a valve controlling the withdrawal of gaseous refrigerant from one of said evaporators for maintaining said one evaporator at a predetermined temperature higher than that of the others of said evaporators.

3. A refrigerating system including a plurality of flooded evaporators, means for supplying liquid refrigerant to said evaporators, means for withdrawing gaseous refrigerant from said evaporators, and means forcing liquid from one of said evaporators and lowering the level of liquid refrigerant therein for maintaining said one evaporator at a predetermined temperature higher than that of the others of said evaporators.

4. A refrigerating system including a plurality of flooded evaporators, means for supplying liquid refrigerant to said evaporators, means for withdrawing gaseous refrigerant from said evaporators, and means forcing substantially all of the liquid refrigerant from one of said evaporators for maintaining said one evaporator at a predetermined temperature higher than that of the others of said evaporators.

5. A refrigerating system including a plurality of flooded evaporators, a header for said evaporators, means for supplying liquid refrigerant to said header and to said evaporators, means connecting said evaporators and said header for withdrawing gaseous refrigerant from said evaporators, and means forcing liquid refrigerant out of one of said evaporators and forcing liquid refrigerant into said header for maintaining said one evaporator at a predetermined temperature higher than that of said others of said evaporators.

6. A refrigerating system including a plurality of flooded evaporators, a header for said evaporators, means for supplying liquid refrigerant to said header and to said evaporators, means including conduits connecting said evaporators and said header for withdrawing gaseous refrigerant from said evaporator, and means including a valve responsive to the temperature of one of said evaporators and arranged in one of said conduits for maintaining said one evaporator at a predetermined temperature higher than that of the others of said evaporators.

LEONARD W. ATCHISON.

DISCLAIMER 2,030,676.—*Leonard W. Atchison*, Schenectady, N. Y. REFRIGERATING SYSTEM. Patent dated February 11, 1936. Disclaimer filed February 1, 1939, by the assignee, *General Electric Company*.

Hereby enters this disclaimer of claims 2, 3, 4, 5, and 6 of said patent.

[*Official Gazette February 21, 1939.*]